United States Patent
Popli et al.

(10) Patent No.: US 10,852,979 B1
(45) Date of Patent: Dec. 1, 2020

(54) SYSTEM AND METHOD OF UTILIZING A NON-VOLATILE SOLID STATE STORAGE DEVICE

(71) Applicant: Dell Products L.P., Round Rock, TX (US)

(72) Inventors: Sumit K. Popli, Campbell, CA (US); Ryan G. Mason, San Jose, CA (US); Suruchi Dubey, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 65 days.

(21) Appl. No.: 16/446,193

(22) Filed: Jun. 19, 2019

(51) Int. Cl.
*G06F 3/06* (2006.01)
*G06F 12/02* (2006.01)

(52) U.S. Cl.
CPC .......... *G06F 3/0646* (2013.01); *G06F 3/0679* (2013.01); *G06F 12/0246* (2013.01)

(58) Field of Classification Search
CPC ... G06F 3/0646; G06F 3/0679; G06F 12/0246
See application file for complete search history.

(56) References Cited

U.S. PATENT DOCUMENTS

| | | | | |
|---|---|---|---|---|
| 8,904,093 | B1* | 12/2014 | Nishimoto | G06F 12/0871 711/103 |
| 9,747,057 | B1* | 8/2017 | Ramani | G06F 3/067 |
| 10,318,180 | B1* | 6/2019 | Benhanokh | G06F 12/0246 |
| 2007/0186070 | A1 | 8/2007 | Federa et al. | |
| 2010/0023673 | A1* | 1/2010 | Struk | G06F 12/126 711/103 |
| 2013/0179624 | A1* | 7/2013 | Lambert | G06F 12/0246 711/103 |
| 2014/0244899 | A1* | 8/2014 | Schmier | G06F 3/0659 711/103 |
| 2016/0034387 | A1* | 2/2016 | Megarity | G06F 12/0246 711/103 |
| 2016/0170642 | A1* | 6/2016 | Miyamoto | G06F 3/0655 711/103 |
| 2016/0283711 | A1* | 9/2016 | Li | G06F 11/3409 |
| 2017/0177222 | A1* | 6/2017 | Singh | G06F 9/45558 |
| 2018/0225058 | A1 | 8/2018 | Kaushik et al. | |
| 2019/0258522 | A1* | 8/2019 | Tanba | G06F 3/0688 |
| 2019/0303019 | A1* | 10/2019 | Sunata | G11C 11/5628 |
| 2019/0340083 | A1* | 11/2019 | Ou-Yang | G06F 1/24 |
| 2020/0050684 | A1* | 2/2020 | Vajravel | G06F 16/1734 |
| 2020/0257469 | A1* | 8/2020 | Popli | G06F 3/0644 |

* cited by examiner

*Primary Examiner* — Ryan Bertram
(74) *Attorney, Agent, or Firm* — Baker Botts L.L.P.

(57) ABSTRACT

In one or more embodiments, one or more system, methods, and/or processes may receive first data associated with a first write operation; may determine if a first amount of data that has been written to a non-volatile solid state storage device (NVSSSD) within a first amount of time has reached or exceeded a first threshold amount; if the first amount of data that has been written to the NVSSSD within the first amount of time has not reached or exceeded the first threshold amount: may store the first data to the NVSSSD and may increment a counter by an amount of the first data; and if the first amount of data that has been written to the NVSSSD within the first amount of time has reached or exceeded the first threshold amount, may store the first data to an overlay of a volatile memory medium.

20 Claims, 4 Drawing Sheets

SYSTEM AND METHOD OF UTILIZING A NON-VOLATILE SOLID STATE STORAGE DEVICE

BACKGROUND

Field of the Disclosure

This disclosure relates generally to information handling systems and more particularly to utilizing non-volatile solid state storage devices with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may receive first data associated with a first write operation; may determine if a first amount of data that has been written to a non-volatile solid state storage device within a first amount of time has reached or exceeded a first threshold amount; if the first amount of data that has been written to the non-volatile solid state storage device within the first amount of time has not reached or exceeded the first threshold amount: may store the first data to the non-volatile solid state storage device; and may increment a counter by an amount of the first data; and if the first amount of data that has been written to the non-volatile solid state storage device within the first amount of time has reached or exceeded the first threshold amount, may store the first data to an overlay of a volatile memory medium.

In one or more embodiments, after the first amount of time, the one or more systems, methods, and/or processes may further receive second data associated with a second write operation; may further determine that the counter is less than the first threshold amount; may further determine a difference amount between the first threshold amount and the counter; may further configure a second threshold amount with a sum of the first threshold amount and the difference amount between the first threshold amount and the counter; may further reset the counter; may further determine if a second amount of data that has been written to the non-volatile solid state storage device within a second amount of time has reached or exceeded the second threshold amount; if the second amount of data that has been written to the non-volatile solid state storage device within the second amount of time has not reached or exceeded the second threshold amount: may further store the second data to the non-volatile solid state storage device; and may further increment the counter by an amount of the second data; and if the second amount of data that has been written to the non-volatile solid state storage device within the second amount of time has reached or exceeded the first threshold amount, may further store the second data to the overlay of the volatile memory medium.

In one or more embodiments, the one or more systems, methods, and/or processes may further store the first data to a buffer after receiving the first data. In one or more embodiments, storing the first data to the non-volatile solid state storage device may include transferring the first data from the buffer to the non-volatile solid state storage device. In one or more embodiments, if the first amount of data that has been written to the non-volatile solid state storage device within the first amount of time has reached or exceeded the first threshold amount, the one or more systems, methods, and/or processes may further provide information that indicates that the first amount of data that has been written to the non-volatile solid state storage device within the first amount of time has reached or exceeded the first threshold amount.

In one or more embodiments, the first amount of time may be twenty-four hours. In one or more embodiments, the non-volatile solid state storage device may include one or more of an embedded MultiMediaCard (eMMC), a solid state drive (SSD), and flash memory, among others. In one or more embodiments, the one or more systems, methods, and/or processes may further determine that the overlay is at a capacity of the overlay. In one or more embodiments, the one or more systems, methods, and/or processes may further perform a reboot process. For example, the reboot process may reboot an information handling system. In one or more embodiments, performing the reboot process may be performed in response to determining that the overlay is at the capacity of the overlay. In one or more embodiments, the first write operation may be configured to modify a file stored by the non-volatile solid state storage device. For example, after storing the first data to the overlay, the overlay may store changes made to the file based at least on the first data.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
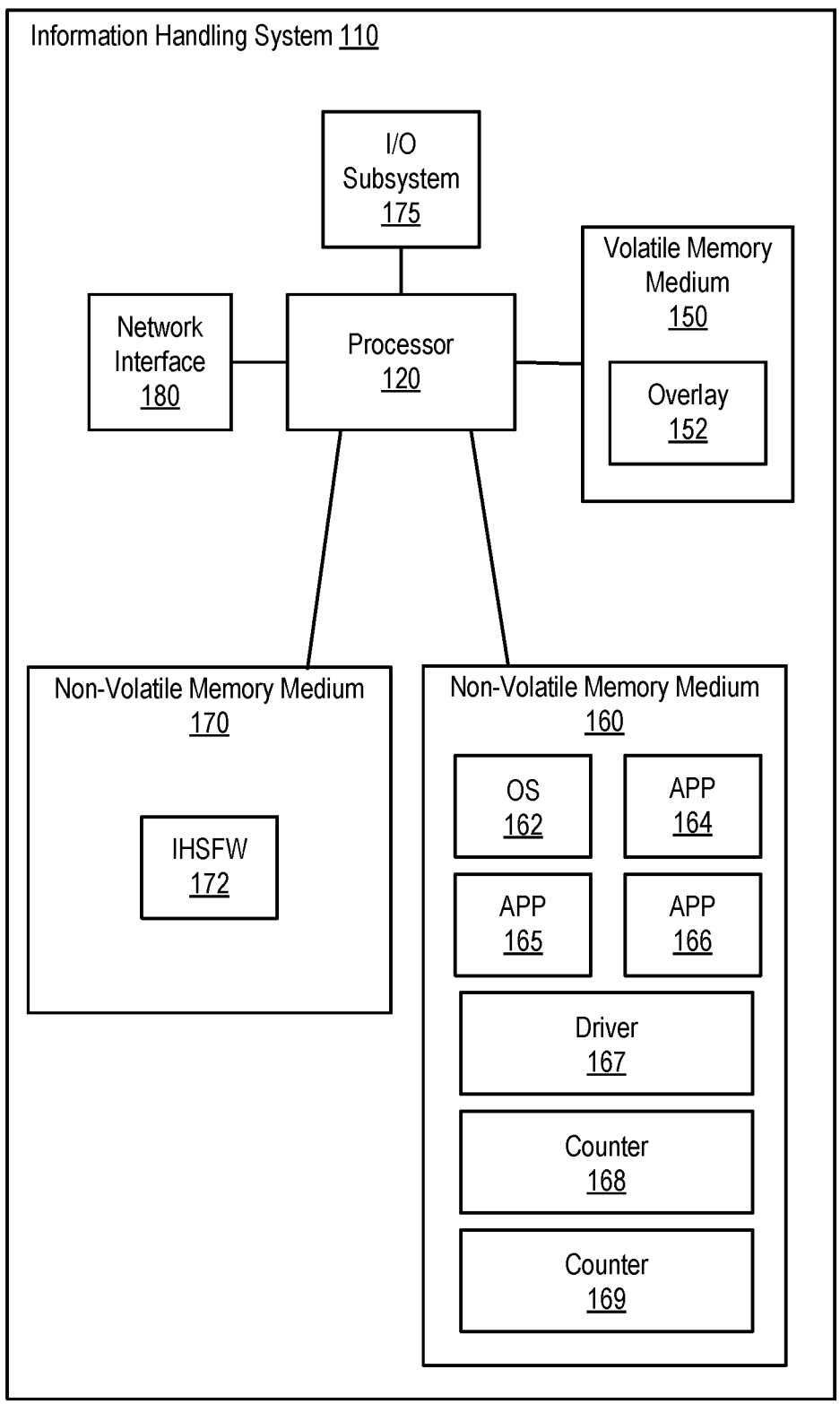
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a thin client may include a non-volatile solid state storage device (NVSSSD). For example, the NVSSSD may include one or more of an embedded MultiMediaCard (eMMC), a solid state drive (SSD), and flash memory, among others. In one or more embodiments, a NVSSSD may be associated with a finite number of write operations. For example, a NVSSSD may be designed for a finite number of write operations. For instance, a NVSSSD may be a consumable, which will wear out after a number of utilizations.

In one or more embodiments, a lifetime of a NVSSSD may be extended via one or more wear leveling processes. For example, a wear leveling process may distribute write operations over various storage areas of the NVSSSD. In one or more embodiments, one or more write operations to a NVSSSD may be captured and redirected to a volatile memory medium overlay. For example, redirecting the one or more write operations to the volatile memory medium overlay may reduce a number of write operations to the NVSSSD. In one instance, redirecting the one or more write operations to the volatile memory medium overlay may only utilize a certain allocation of a volatile memory medium. In a second instance, an application may be required to be apprised of the volatile memory medium overlay. In a third instance, the certain allocation of the volatile memory medium for the volatile memory medium overlay may reduce an amount of volatile memory medium for utilization by applications. In another instance, when the volatile memory medium overlay becomes fully utilized, an information handling system may be required to be rebooted.

In one or more embodiments, a NVSSSD may be associated with a number of recommended write operations per day. For example, a manufacturer of the NVSSSD may specify the number of recommended write operations per day for a predicted amount of time (e.g., a lifetime) that the NVSSSD may be utilizable. In one or more embodiments, a NVSSSD may be associated with a number of recommended write operations per a lifetime of the NVSSSD. In one or more embodiments, a number of recommended write operations per day may be determined via the lifetime of the NVSSSD and the number of recommended write operations per the lifetime of the NVSSSD. For example, the number of recommended write operations per day may be determined via dividing the number of recommended write operations per the lifetime of the NVSSSD divided by the lifetime (in days) of the NVSSSD. In one or more embodiments, one or more counters may be utilized. In one example, a counter may be utilized to store a number of write operations to a NVSSSD for a day. For instance, a day may include a twenty-four hour period of time. In another example, a counter may be utilized to store a number of write operations to a NVSSSD for a lifetime of the NVSSSD.

In one or more embodiments, when a write operation is requested, it may be determined if a threshold number of write operations to a NVSSSD for a day has been exceeded. For example, a number of write operations to a NVSSSD for a day, stored via a counter, may be compared with the threshold number of write operations to a NVSSSD for a day. If the number of write operations to the NVSSSD for the day has been exceeded, the write operation may be performed to a volatile memory medium overlay. If the number of write operations to the NVSSSD for the day has not been exceeded, the write operation may be performed to the NVSSSD. If the number of write operations to the NVSSSD for the day has not been exceeded, the counter that stores the number of write operations to the NVSSSD for the day may be incremented. In one or more embodiments, this may eliminate or delay a utilization of a volatile memory medium overlay. In one or more embodiments, this may reduce a utilization of a volatile memory medium overlay. In one or more embodiments, eliminating or delaying a utilization of a volatile memory medium overlay may provide an advantage of not reducing an amount of a volatile memory medium that one or more applications may utilize. In one or more embodiments, eliminating or delaying a utilization of a volatile memory medium overlay may reduce a number of reboots of an information handling system. For example, when the overlay becomes full (e.g., at its capacity), the information handling system may need to be rebooted. For example, reducing a number of reboots of the information handling system may provide an advantage by increasing an amount of time that the information handling system may be useful and/or utilized.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a thin client, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (FC) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, a NVSSSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150, 160, and 170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-166. In one or more embodiments, one or more of OS 162 and APPs 164-166 may include processor instructions executable by processor 120. In one example, processor 120 may execute processor instructions of one or more of OS 162 and APPs 164-166 via non-volatile memory medium 160. In another example, one or more portions of the processor instructions of the one or more of OS 162 and APPs 164-166 may be transferred to volatile memory medium 150, and processor 120 may execute the one or more portions of the processor instructions of the one or more of OS 162 and APPs 164-166 via volatile memory medium 150. In one or more embodiments, OS 162 may be or include an embedded OS. For example, a thin client may utilize the embedded OS. As illustrated, non-volatile memory medium 160 may include a driver 167. In one or more embodiments, driver 167 may be or include a device driver. As shown, non-volatile memory medium 160 may include counters 168 and 169. In one example, counter 168 may store an amount of data that has been written to a NVSSSD during a lifetime of the NSSSD. In another example, counter 169 may store an amount of data that has been written to a NVSSSD during a period of time. For instance, the period of time may be or include a day (e.g., a twenty-four hour period of time).

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

In one or more embodiments, a device driver or a "driver" (e.g., driver 167) may include instructions, executable via a processor, that interfaces with, operates, and/or controls a device that may be communicatively coupled to an information handling system. For example, a device driver may provide a software and/or operating system interface to one or more hardware devices, enabling the software and/or operating system to access hardware functionality of the one or more devices. In one or more embodiments, a device driver may include processor-executable instructions in accordance with at least a portion of one or more flowcharts, one or more systems, one or more methods, and/or one or more processes described herein. In one or more embodiments, a device driver may communicate with the one or more devices via a communications bus and/or a communications subsystem to which the one or more devices may be communicatively coupled. For example, a calling subroutine (e.g., instructions executable via a processor) invokes and/or instantiates a routine in the device driver, the device driver may issue and/or provide one or more commands and/or instructions to the one or more devices. For instance, the device driver, based on the one or more commands and/or instructions, may invoke and/or instantiate functionality of the one or more devices, retrieve information from the one or more devices, and/or store information to the one or more devices.

In one or more embodiments, the device driver may provide interrupt handling of asynchronous and/or time-dependent one or more hardware interfaces and/or one or more devices. For example, in response to an interrupt, the device driver may automatically retrieve data from one or more devices and provide the data from the one or more devices to an OS. In one instance, the device driver may provide the data from the one or more devices to one or more queues of the OS. In another instance, the device driver may query and/or retrieve data from a touchpad and provide availability of the data to programs that utilize pointer functionality.

In one or more embodiments, an OS may include a device driver. For example, the device driver may be included in the OS when the OS is compiled. In one or more embodiments, an OS may load a device driver. For example, the device driver may not be included in the OS when the OS is compiled but loaded after at least a portion of the OS is executed via a processor. For instance, the device driver may be, include, or be included in a kernel loadable module.

In one or more embodiments, driver 167 may include a file-based write filter. For example, the file-based write filter may operate at a file level. For instance, the write filter may operate at a sector level to redirect all writes that target an overlay. As illustrated, volatile memory medium 150 may include an overlay 152. In one or more embodiments, overlay 152 may be or include a portion of volatile memory medium 150. For example, overlay 152 may be or include a volume that is stored via the volatile memory medium. In one or more embodiments, driver 167 may redirect writes that target overlay 152. In one or more embodiments, overlay 152 may store changes made to a file stored via a non-volatile memory medium. For example, overlay 152 may store changes made to a NVSSSD. For instance, overlay 152 may store changes made to a file stored by the NVSSSD. In one or more embodiments, the changes made to a file stored by the NVSSSD may not modify the file stored by the NVSSSD. For example, driver 167 may provide the file stored by the NVSSSD with the changes made to the file stored by the NVSSSD even though the file stored by the NVSSSD was not modified.

In one or more embodiments, if an application performs a write operation to the file stored by the NVSSSD, overlay 152 may store data associated with the write operation. For example, when a read operation is performed to the file stored by the NVSSSD, overlay 152 may provide the data associated with the write operation. For instance, overlay 152 may provide a portion of the file with any changes that were made to the file even though the file stored by the NVSSSD was not modified or changed.

Figure 2:
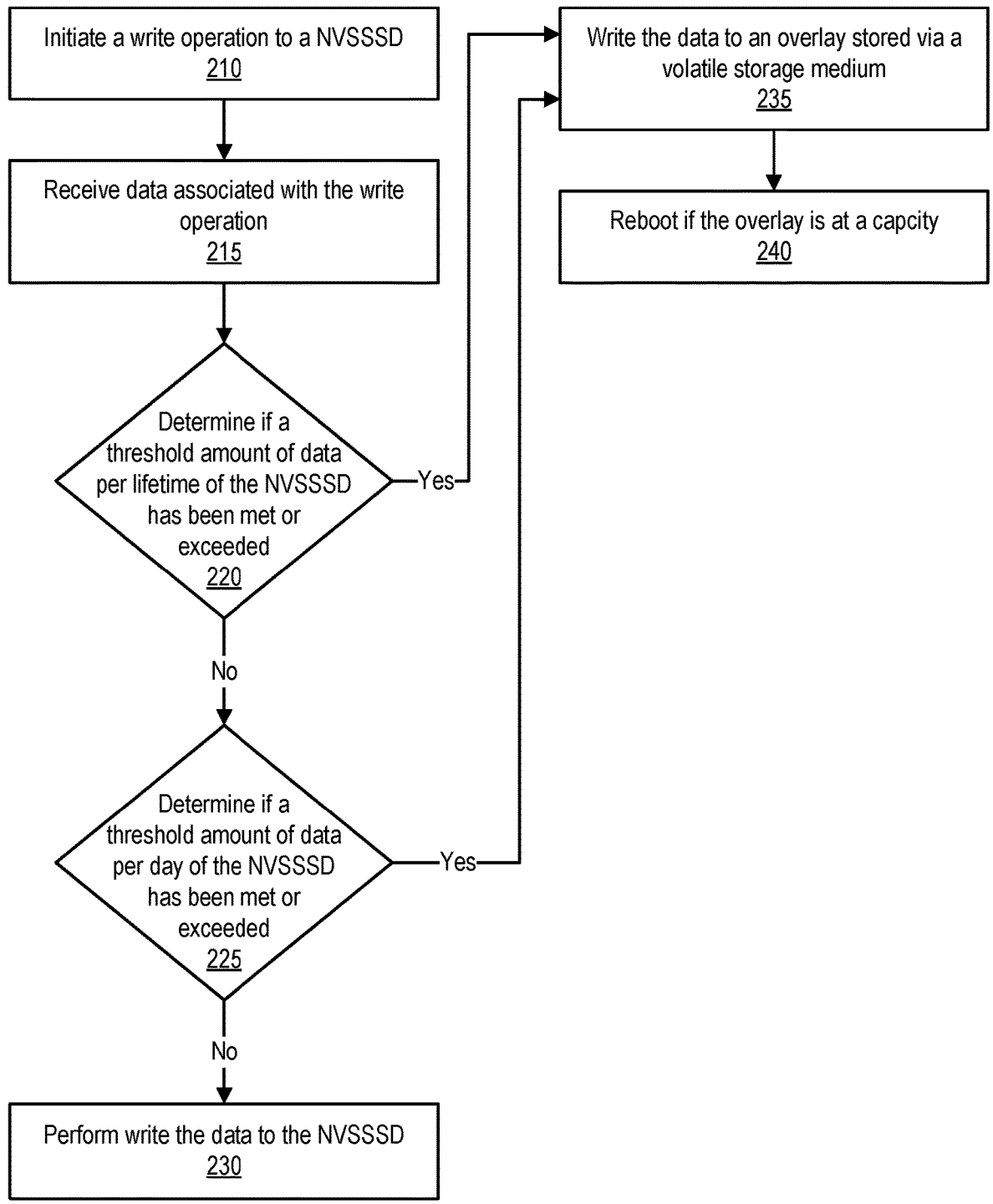
FIG. 2 illustrates an example of a method, according to one or more embodiments.

Turning now to FIG. 2, an example of a method is illustrated, according to one or more embodiments. At 210, a write operation may be initiated to a NVSSSD. For example, an application may initiate a write operation may to a NVSSSD. For instance, non-volatile memory medium 160 may be or include the NVSSSD. In one or more embodiments, the application may be an application of APPs 164-166. In one or more embodiments, the application may be executed via a network. For example, the application may not be stored locally by IHS 110.

At 215, data associated with the write operation may be received. For example, driver 167 may receive the data associated with the write operation. For instance, driver 167 may intercept the write operation. At 220, it may be determined if a threshold of amount of data per lifetime of the NVSSD has been met or exceeded. For example, driver 167 may determine if a threshold of amount of data per lifetime of the NVSSSD has been met or exceeded. In one or more embodiments, counter 168 may store an amount of data that has been written to the NVSSSD during a lifetime of the NSSSD. For example, determining if a threshold of amount of data per lifetime of the NVSSD has been met or exceeded may include determining if counter 168 meets or exceeds the threshold of amount of data per lifetime of the NVSSD.

If the threshold of amount of data per lifetime of the NVSSD has not been met or exceeded, it may be determined if a threshold of amount of data per day of the NVSSD has been met or exceeded, at 225. For example, driver 167 may determine if a threshold of amount of data per day of the NVSSSD has been met or exceeded. In one or more embodiments, counter 169 may store an amount of data that has been written to the NVSSSD during a day (e.g., a twenty-four hour period of time). For example, determining if a threshold of amount of data per day has been met or exceeded may include determining if counter 169 meets or exceeds the threshold of amount of data per day. In one or more embodiments, counter 169 may be reset. In one example, counter 169 may be reset at a beginning of a day. In another example, counter 169 may be reset at an ending of a day.

If the threshold of amount of data per day of the NVSSD has not been met or exceeded, the data may be written to the NVSSSD, at 230. For example, driver 167 may write the data to the NVSSSD. If the threshold of amount of data per lifetime of the NVSSD has been met or exceeded, the data may be written to an overlay stored via a volatile storage medium, at 235. If the threshold of amount of data per day of the NVSSD has been met or exceeded, the data may be written to the overlay stored via the volatile storage medium, at 235. For example, driver 167 may write the data to the overlay (e.g., overlay 152) stored via the volatile storage medium (e.g., volatile storage medium 150). At 240, IHS 110 may be rebooted if the overlay is at a capacity. For example, IHS 110 may be rebooted if the overlay is full.

Figure 3A:
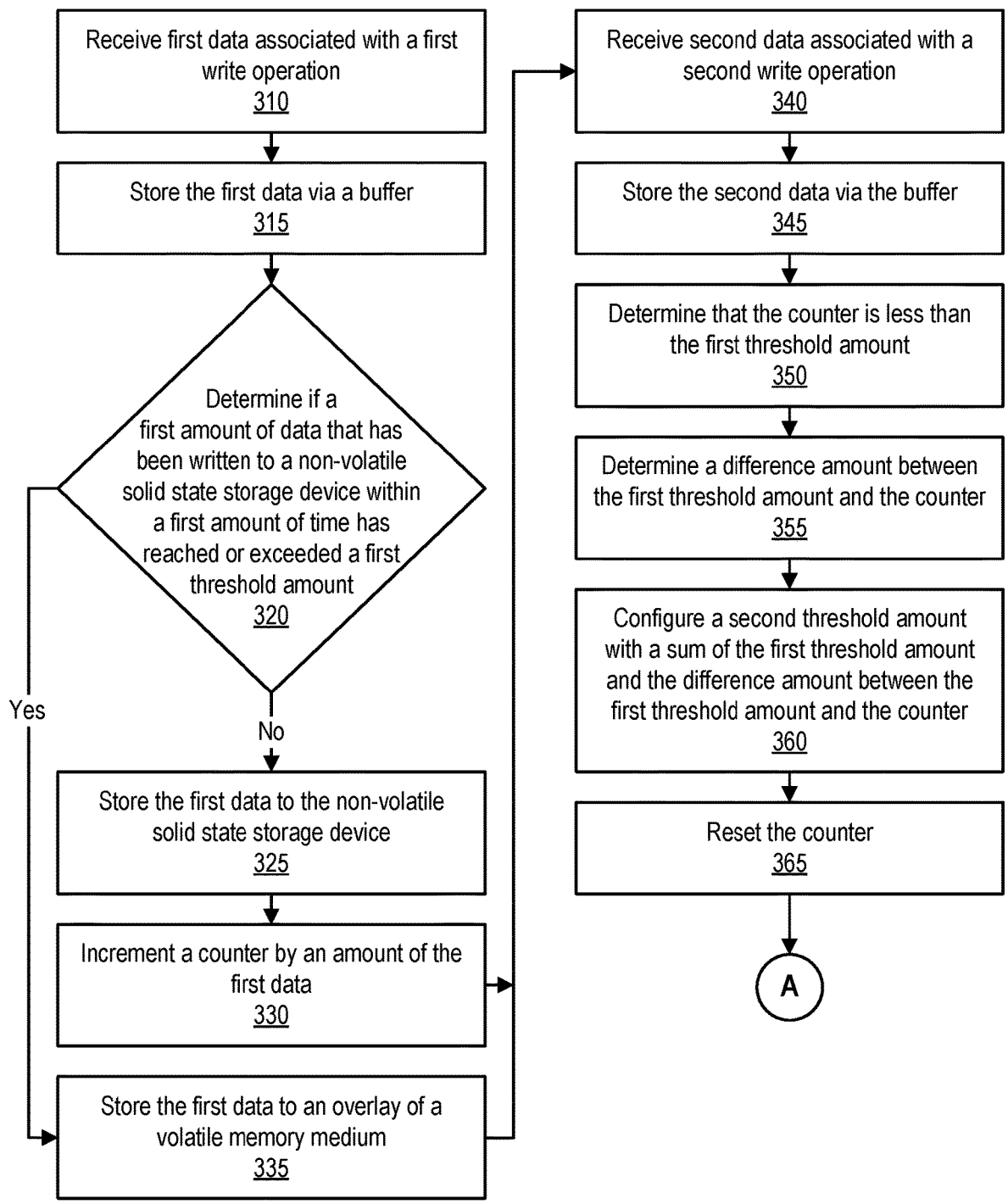
FIGS. 3A and 3B illustrates another example of a method, according to one or more embodiments.
Figure 3B:
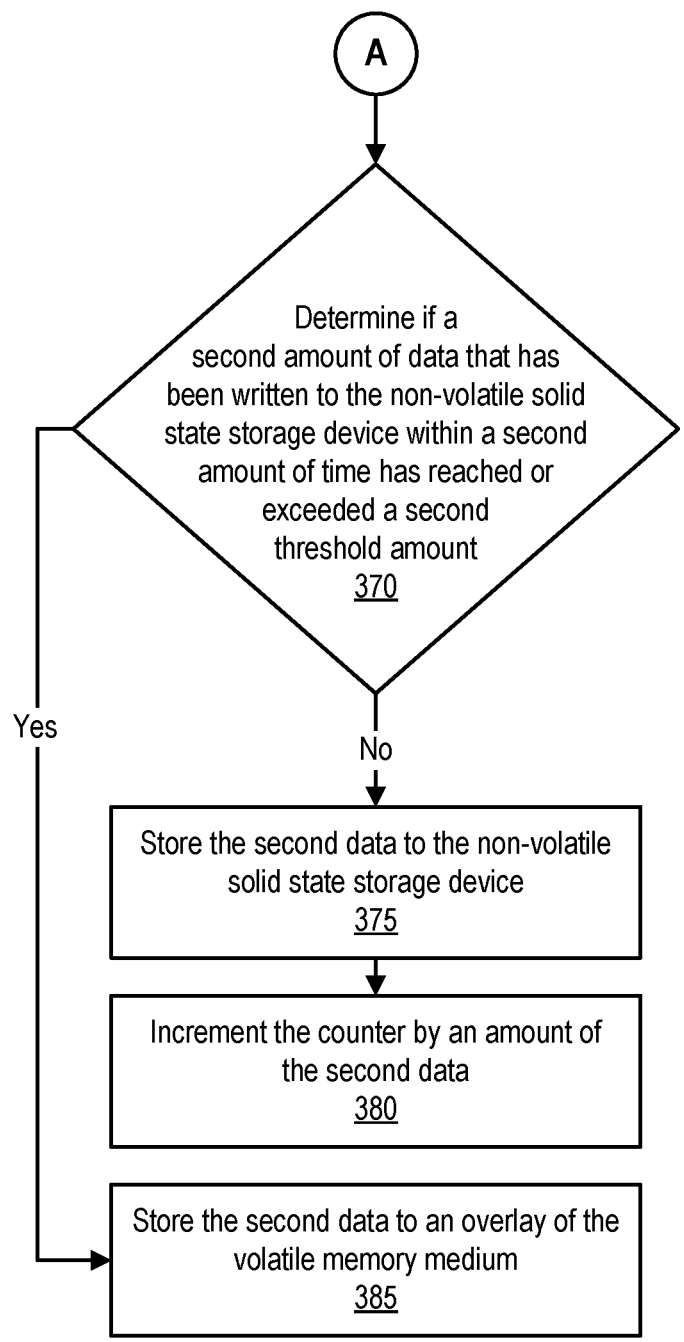

Turning now to FIGS. 3A and 3B, another example of a method is illustrated, according to one or more embodiments. At 310, first data associated with a first write operation may be received. For example, driver 167 may receive first data associated with a first write operation. For instance, driver 167 may intercept the first write operation. At 315, the first data may be stored via a buffer. For example, driver 167 may store the first data via a buffer. For instance, volatile memory 150 may include the buffer.

At 320, it may be determined if a first amount of data that has been written to a non-volatile solid state storage device within a first amount of time has reached or exceeded a first threshold amount. For example, driver 167 may determine if a first amount of data that has been written to a non-volatile solid state storage device within a first amount of time has reached or exceeded a first threshold amount. In one or more embodiments, the first amount of time may include a day. For example, the first amount of time may include twenty-four (24) hours. In one or more embodiments, the first amount of time may include any amount of time. For example, the first amount of time may be configurable.

In one or more embodiments, the first threshold amount may be or include an amount of data that may be written to the non-volatile solid state storage device for the first amount of time. For example, the first threshold amount may be specified and/or recommended by a manufacturer of the non-volatile solid state storage device. In one or more embodiments, the first threshold amount may be configurable. For example, an administrator (e.g., a user) may configure the first threshold amount.

If the first amount of data that has been written to the non-volatile solid state storage device within the first amount of time has not reached or exceeded the first threshold amount, the first data may be stored to the non-volatile solid state storage device, at 325. For example, driver 167 may store the first data to the non-volatile solid state storage device. In one or more embodiments, storing the first data to the non-volatile solid state storage device may include transferring the first data from the buffer to the non-volatile solid state storage device.

At 330, a counter may be incremented by an amount of the first data. For example, counter 169 may be incremented by an amount of the first data. For instance, driver 167 may increment counter 169 by an amount of the first data. In one or more embodiments, counter 168 may be incremented by an amount of the first data. For example, driver 167 may increment counter 168 by an amount of the first data.

If the first amount of data that has been written to the non-volatile solid state storage device within the first amount of time has reached or exceeded the first threshold amount, the first data may be stored to an overlay of a volatile memory medium, at 335. For example, driver 167 may store the first data to an overlay (e.g., overlay 152) of a volatile memory medium (e.g., volatile memory medium 150). In one or more embodiments, the first write operation may be configured to modify a file. For example, the non-volatile solid state storage device may store the file. For instance, after the storing the first data to the overlay, the overlay may store changes made to the file based at least on the first data.

In one or more embodiments, information that indicates that the first amount of data that has been written to the non-volatile solid state storage device within the first amount of time has reached or exceeded the threshold amount may be provided. For example, driver 167 may provide the information. In one or more embodiments, the information may be provided to a log file. In one or more embodiments, the information may be provided to an information handling system. For example, the information may be provided to an information handling system associated with one or more administrators.

At 340, second data associated with a second write operation may be received. For example, driver 167 may receive second data associated with a second write operation. For instance, driver 167 may intercept the second write operation. In one or more embodiments, method element 340 may be performed after the first amount of time. At 345, the second data may be stored via the buffer. For example, driver 167 may store the second data via the buffer. At 350, it may be determined that the counter is less than the first threshold amount. For example, driver 167 may determine that the counter is less than the first threshold amount. For instance, driver 167 may determine that counter 169 is less than the first threshold amount.

In one or more embodiments, the first threshold amount may be a per day amount. For example, determining that counter 169 is less than a per day amount from a previous day. For instance, if an amount of data written to the non-volatile solid state storage device has not reached the first threshold from the previous day, additional data may be written to the non-volatile solid state storage device on a subsequent day.

At 355, a difference amount between the first threshold amount and the counter may be determined. For example, driver 167 may determine a difference amount between the first threshold amount and the counter. For instance, driver 167 may determine a difference amount between the first threshold amount and counter 169. At 360, a second threshold amount may be configured with a sum of the first threshold amount and the difference amount between the first threshold amount and the counter. For example, driver 167 may configure a second threshold amount with a sum of the first threshold amount and the difference amount between the first threshold amount and the counter.

At 365, the counter may be reset. For example, driver 167 may reset the counter. For instance, driver 167 may reset counter 169. At 370, it may be determined if a second amount of data that has been written to the non-volatile solid state storage device within a second amount of time has reached or exceeded the second threshold amount. For example, driver 167 may determine if a second amount of data that has been written to the non-volatile solid state storage device within a second amount of time has reached or exceeded the second threshold amount.

If the second amount of data that has been written to the non-volatile solid state storage device within the second amount of time has not reached or exceeded the second threshold amount, the second data may be stored to the non-volatile solid state storage device, at 375. For example, driver 167 may store the second data to the non-volatile solid state storage device. In one or more embodiments, storing the second data to the non-volatile solid state storage device may include transferring the second data from the buffer to the non-volatile solid state storage device.

At 380, the counter may be incremented by an amount of the second data. For example, counter 169 may be incremented by an amount of the second data. For instance, driver 167 may increment counter 169 by an amount of the second data. In one or more embodiments, counter 168 may be incremented by an amount of the second data. For example, driver 167 may increment counter 168 by an amount of the second data.

If the second amount of data that has been written to the non-volatile solid state storage device within the second amount of time has reached or exceeded the second threshold amount, the second data may be stored to the overlay of the volatile memory medium, at 385. For example, driver 167 may store the second data to the overlay (e.g., overlay 152) of the volatile memory medium (e.g., volatile memory medium 150).

In one or more embodiments, method elements 340-385 may be performed after the first amount of time. In one example, the first amount of time may be a first day. In another example, the second amount of time may be a second day. For instance, the second day may be a day after the first day. In one or more embodiments, method elements 340-385 may be performed on the second day.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor; and
   a memory medium, coupled to the at least one processor, that stores instructions executable by the at least one processor, which when executed by the at least one processor, cause the information handling system to:
   receive first data associated with a first write operation;
   determine if a first amount of data that has been written to a non-volatile solid state storage device within a first amount of time has reached or exceeded a first threshold amount;
   if the first amount of data that has been written to the non-volatile solid state storage device within the first amount of time has not reached or exceeded the first threshold amount:
     store the first data to the non-volatile solid state storage device; and
     increment a counter by an amount of the first data;
   if the first amount of data that has been written to the non-volatile solid state storage device within the first amount of time has reached or exceeded the first threshold amount, store the first data to an overlay of a volatile memory medium;
   after the first amount of time:
     receive second data associated with a second write operation;
     determine that the counter is less than the first threshold amount;
     determine a difference amount between the first threshold amount and the counter;
     configure a second threshold amount with a sum of the first threshold amount and the difference amount between the first threshold amount and the counter;
     reset the counter;
     determine if a second amount of data that has been written to the non-volatile solid state storage device within a second amount of time has reached or exceeded the second threshold amount;

if the second amount of data that has been written to the non-volatile solid state storage device within the second amount of time has not reached or exceeded the second threshold amount:

store the second data to the non-volatile solid state storage device; and increment the counter by an amount of the second data; and if the second amount of data that has been written to the non-volatile solid state storage device within the second amount of time has reached or exceeded the first threshold amount, store the second data to the overlay of the volatile memory medium.

2. The information handling system of claim 1, wherein the instructions further cause the information handling system to:

after receiving the first data, store the first data to a buffer; and wherein, to store the first data to the non-volatile solid state storage device, the instructions further cause the information handling system to transfer the first data from the buffer to the non-volatile solid state storage device.

3. The information handling system of claim 1, wherein the instructions further cause the information handling system to:

if the first amount of data that has been written to the non-volatile solid state storage device within the first amount of time has reached or exceeded the first threshold amount, provide information that indicates that the first amount of data that has been written to the non-volatile solid state storage device within the first amount of time has reached or exceeded the first threshold amount.

4. The information handling system of claim 1, wherein the first amount of time is twenty-four hours.

5. The information handling system of claim 1, wherein the non-volatile solid state storage device includes one or more of an embedded MultiMediaCard (eMMC), a solid state drive (SSD), and flash memory.

6. The information handling system of claim 1, wherein the instructions further cause the information handling system to:

determine that the overlay is at a capacity of the overlay; and in response to determining that the overlay is at the capacity of the overlay, perform a reboot process of the information handling system.

7. The information handling system of claim 1, wherein the first write operation is configured to modify a file stored by the non-volatile solid state storage device; and wherein, after storing the first data to the overlay, the overlay stores changes made to the file based at least on the first data.

8. A method, comprising:

receiving first data associated with a first write operation;

determining if a first amount of data that has been written to a non-volatile solid state storage device within a first amount of time has reached or exceeded a first threshold amount;

if the first amount of data that has been written to the non-volatile solid state storage device within the first amount of time has not reached or exceeded the first threshold amount:

storing the first data to the non-volatile solid state storage device; and incrementing a counter by an amount of the first data;

if the first amount of data that has been written to the non-volatile solid state storage device within the first amount of time has reached or exceeded the first threshold amount, storing the first data to an overlay of a volatile memory medium;

after the first amount of time:

receiving second data associated with a second write operation;

determining that the counter is less than the first threshold amount;

determining a difference amount between the first threshold amount and the counter;

configuring a second threshold amount with a sum of the first threshold amount and the difference amount between the first threshold amount and the counter;

resetting the counter;

determining if a second amount of data that has been written to the non-volatile solid state storage device within a second amount of time has reached or exceeded the second threshold amount;

if the second amount of data that has been written to the non-volatile solid state storage device within the second amount of time has not reached or exceeded the second threshold amount:

storing the second data to the non-volatile solid state storage device; and incrementing the counter by an amount of the second data; and if the second amount of data that has been written to the non-volatile solid state storage device within the second amount of time has reached or exceeded the first threshold amount, storing the second data to the overlay of the volatile memory medium.

9. The method of claim 8, further comprising:

after the receiving the first data, storing the first data to a buffer;

wherein the storing the first data to the non-volatile solid state storage device includes transferring the first data from the buffer to the non-volatile solid state storage device.

10. The method of claim 8, further comprising:

if the first amount of data that has been written to the non-volatile solid state storage device within the first amount of time has reached or exceeded the first threshold amount, providing information that indicates that the first amount of data that has been written to the non-volatile solid state storage device within the first amount of time has reached or exceeded the first threshold amount.

11. The method of claim 8, wherein the first amount of time is twenty-four hours.

12. The method of claim 8, wherein the non-volatile solid state storage device includes one or more of an embedded MultiMediaCard (eMMC), a solid state drive (SSD), and flash memory.

13. The method of claim 8, further comprising:

determining that the overlay is at a capacity of the overlay; and in response to the determining that the overlay is at the capacity of the overlay, performing a reboot process.

14. The method of claim 8,
wherein the first write operation is configured to modify a file stored by the non-volatile solid state storage device; and
wherein, after the storing the first data to the overlay, the overlay stores changes made to the file based at least on the first data.

15. A computer-readable non-transitory memory medium that includes instructions that, when executed by at least one processor of an information handling system, cause the information handling system to:
  receive first data associated with a first write operation;
  determine if a first amount of data that has been written to a non-volatile solid state storage device within a first amount of time has reached or exceeded a first threshold amount;
  if the first amount of data that has been written to the non-volatile solid state storage device within the first amount of time has not reached or exceeded the first threshold amount:
    store the first data to the non-volatile solid state storage device; and
    increment a counter by an amount of the first data;
  if the first amount of data that has been written to the non-volatile solid state storage device within the first amount of time has reached or exceeded the first threshold amount, store the first data to an overlay of a volatile memory medium;
  after the first amount of time:
    receive second data associated with a second write operation;
    determine that the counter is less than the first threshold amount;
    determine a difference amount between the first threshold amount and the counter;
    configure a second threshold amount with a sum of the first threshold amount and the difference amount between the first threshold amount and the counter;
    reset the counter;
    determine if a second amount of data that has been written to the non-volatile solid state storage device within a second amount of time has reached or exceeded the second threshold amount;
    if the second amount of data that has been written to the non-volatile solid state storage device within the second amount of time has not reached or exceeded the second threshold amount:
      store the second data to the non-volatile solid state storage device; and
      increment the counter by an amount of the second data; and
    if the second amount of data that has been written to the non-volatile solid state storage device within the second amount of time has reached or exceeded the first threshold amount, store the second data to the overlay of the volatile memory medium.

16. The computer-readable non-transitory memory medium of claim 15,
wherein the instructions further cause the information handling system to:
  after receiving the first data, store the first data to a buffer; and
wherein, to store the first data to the non-volatile solid state storage device, the instructions further cause the information handling system to transfer the first data from the buffer to the non-volatile solid state storage device.

17. The computer-readable non-transitory memory medium of claim 15, wherein the instructions further cause the information handling system to:
  if the first amount of data that has been written to the non-volatile solid state storage device within the first amount of time has reached or exceeded the first threshold amount, provide information that indicates that the first amount of data that has been written to the non-volatile solid state storage device within the first amount of time has reached or exceeded the first threshold amount.

18. The computer-readable non-transitory memory medium of claim 15, wherein the first amount of time is twenty-four hours.

19. The computer-readable non-transitory memory medium of claim 15, wherein the non-volatile solid state storage device includes one or more of an embedded MultiMediaCard (eMMC), a solid state drive (SSD), and flash memory.

20. The computer-readable non-transitory memory medium of claim 15,
wherein the first write operation is configured to modify a file stored by the non-volatile solid state storage device; and
wherein, after storing the first data to the overlay, the overlay stores changes made to the file based at least on the first data.

\* \* \* \* \*